United States Patent [19]

Devon

[11] Patent Number: 4,608,239

[45] Date of Patent: Aug. 26, 1986

[54] REMOVAL OF IRON PENTACARBONYL FROM GASEOUS STREAMS CONTAINING CARBON MONOXIDE

[75] Inventor: Thomas J. Devon, Longview, Tex.

[73] Assignee: Eastman Kodak Company, Rochester, N.Y.

[21] Appl. No.: 805,638

[22] Filed: Dec. 6, 1985

[51] Int. Cl.$^4$ .................... B01D 47/00; B01J 8/00; C01B 00/00

[52] U.S. Cl. .................... 423/210; 423/245; 423/415 R

[58] Field of Search .......... 423/210 S, 210 R, 210 M, 423/245 R, 245 S, 415 R Primary Examiner—John Doll
Assistant Examiner—Lori S. Freeman Attorney, Agent, or Firm—Donald W. Spurrell; J. Frederick Thomsen

[57] ABSTRACT

A process for removing iron pentacarbonyl from carbon monoxide feed gas, comprising contacting the gas with a removal agent comprising alkali metal hydroxide in association with a high boiling hydroxylic solvent to form a nonvolatile iron carbonylate salt, and separating the gas from said agent and the salt. Preferably, the removal agent is adsorbed on a porous support such as diatomaceous earth at a concentration of from about 1% to about 40% by weight of the support, and the solvent is selected from one or mixtures of ethylene glycol, diethylene glycol, triethylene glycol, tetraethylene glycol, 2,2,4-trimethyl-1,3-pentanediol, glycerine, triethanolamine, 1,4-butanediol, 1,2-propanediol, 1,3-butanediol, 2,5-hexanediol, 1-hexanol and 2-hexanol.

6 Claims, No Drawings

REMOVAL OF IRON PENTACARBONYL FROM GASEOUS STREAMS CONTAINING CARBON MONOXIDE

This invention concerns a method for the simple and effective removal of iron pentacarbonyl impurity from carbon monoxide or streams that contain carbon monoxide.

Iron pentacarbonyl is a chronic contaminant either entrained or vaporized in carbon monoxide and in streams that contain carbon monoxide. It is formed by the interaction of carbon monoxide with iron at high pressures and/or elevated temperatures. For example, carbon monoxide from cylinders made of carbon steel, in synthesis gas produced by the gasification of coal and in coke-oven gas contain this iron contaminant which, because of its coloration and auto degradation catalytic effects, has to be removed ultimately from products produced from the carbon monoxide stream. Moreover, iron pentacarbonyl is known to have adverse effects on oxo, hydroformylation and similar catalyst systems. In this regard, iron pentacarbonyl contamination of synthesis gas used for the preparation of aldehyde products via hydroformylation reactions promotes aldol by-product formation after its conversion to iron carboxylate in the hydroformylation reactor. Also, it was observed that the accumulation of iron pentacarbonyl in a hydroformylation reaction employing a rhodium-tricyclohexylphosphine ligandized catalyst resulted in the removal of the stabilizing ligand by formation of a stable iron tricyclohexylphosphine tetracarbonyl complex. This iron complex was observed and identified in recovered catalyst by characteristic metal-carbonyl infrared absorption at 1,927 cm$^{-1}$ and a $^{31}$p nuclear magnetic resonance absorption at $-83$ ppm relative to 85% aqueous phosphoric acid. Thus, removal of iron pentacarbonyl from carbon monoxide containing streams is highly desirable for increasing the yield of aldehyde product by reducing aldol by-product formation, and for suppressing losses of valuable stabilizing organophosphorus ligand.

This contamination problem is also present in the preparation of coal derived synthesis gas chemicals such as acetic acid and acetic anhydride where the introduction of iron pentacarbonyl into the reactor through contaminated carbon monoxide leads to the accumulation of iron in the catalyst that can only be removed by sludging a catalyst slipstream. The recovery of precious catalyst metals such as rhodium from such slipstreams is difficult and requires substantial extra capital expenditure.

Applicant is aware of four references that mention the removal of iron pentacarbonyl from carbon monoxide streams. None of these techniques is satisfactory for applicants' purposes. In Dvorak et al, Czech CS No. 187,947, Nov. 15, 1981, Chemical Abstracts 96, 164993e, a solid phase catalyst containing CuO/ZnO was reported to remove iron from synthesis gas from an initial iron concentration of 7 mg Fe/m$^2$ down to 5.7–6 mg Fe/m$^2$. U.S. Pat. No. 3,780,163 uses the toxic compound ozone to remove iron carbonyl from either gases containing carbon monoxide or from liquids such as ethyl acetate. U.S. Pat. No. 3,466,340 concerns the removal of iron pentacarbonyl from liquid methanol or other alcohols using a solid ion exchange resin containing amino groups. French Pat. No. 2,040,232 passes contaminated methanol through a bed of Fe$_2$O$_3$ pellets to remove the iron pentacarbonyl.

In the present invention the contaminated gas is passed through a removal agent comprising an alkali metal hydroxide (1) in solution in suitable solvent, or (2) said solution adsorbed on porous solid support which is in suspended form in a suitable suspension medium, or (3) said solution adsorbed on porous solid support in a fixed bed system. The solvent which must be high boiling and hydroxylic in nature, in (1) holds the alkali metal hydroxide in solution for reaction with the iron pentacarbonyl, and in (2) and (3) carries the hydroxide onto the surface and into the pores of the solid support for establishing the reaction sites. Because of the simplicity, effectiveness and ease of use, agent (3) is preferred.

The invention with respect to 2 and 3 appears to function by converting volatile iron pentacarbonyl into nonvolatile ionic alkali metal iron tetracarbonylate salts that are trapped on the support. The theorized stoichiometry of the reaction is

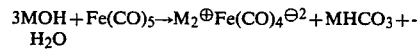
$$3MOH + Fe(CO)_5 \rightarrow M_2^{\oplus}Fe(CO)_4^{\ominus 2} + MHCO_3 + H_2O$$

The reaction takes place quantitatively at room temperature in alcoholic solvents. This process provides an effective and simple method that has been demonstrated to remove greater than 95% of the iron pentacarbonyl impurity from contaminated gas.

The support material employed in this invention should not react with alkali metal hydroxide and should be porous to allow permeation by the high boiling solvent containing the alkali metal hydroxide, and should have a moderately high surface area to allow good contact with the contaminated gas stream that passes through the bed. Such material includes celatom, basic alumina, kieselguhr, diatomaceous earth, and carbon.

The high boiling hydroxylic solvent should be essentially inert to and provide a liquid phase for the alkali metal hydroxide for enhancing its reaction with iron pentacarbonyl. The normal boiling point of the solvent should be high, preferably above 150° C., so as to suppress its loss from the support by gas stripping caused by the passage of carbon monoxide and other gaseous components across the bed. Useful solvents include polyhydroxy compounds such as ethylene glycol, diethylene glycol, triethylene glycol, tetraethylene glycol, 2,2,4-trimethyl-1,3-pentanediol, glycerine, triethanolamine, 1,4-butanediol, 1,2-propanediol, 1,3-butanediol, and 2,5-hexanediol. High boiling monohydroxy alcohols such as 1-hexanol and 2-ethylhexanol may be used but are not as effective as the above preferred polyhydroxy solvents.

Most useful hydroxides include those of lithium, sodium, potassium, rubidium, and cesium. Economic considerations made sodium and potassium the preferred metals. The alkali metal hydroxides are preferred over those of alkaline metals such as calcium, magnesium, barium and strontium since these hydroxides are much less soluble in most hydroxylic solvents than the corresponding alkali metal hydroxides. Low solubility of the hydroxide causes problems in getting even impregnation or distribution thereof in the support which reduces the effectiveness of the bed in removing iron pentacarbonyl.

EXAMPLE 1

Preparation of Fe(CO)$_5$ Removal Agent

Diatomaceous earth, 100 grams (8–12 mesh), was treated with 150 ml of methanol and subjected to vacuum to degas the pores of the support. Atmospheric pressure was restored and the slurry was treated at room temperature with a solution of 10 grams of potassium hydroxide dissolved in a mixture of 30 grams of triethylene glycol and 60 ml of methanol. The slurry was placed on a rotary evaporator and the methanol stripped away by heating to 50° C. and dropping the pressure to 5 mm of mercury. The resulting removal agent was a free-flowing solid.

EXAMPLE 2

Iron Pentacarbonyl Removal from Carbon Monoxide

In this example, all apparatus except the standard carbon steel CO and H$_2$ cylinders, which came into contact with reactants or product was of stainless steel from which iron could not be extracted under the operating conditions.

The removal agent from Example 1 was placed in a 1-inch diameter × 15-inch length of pipe to provide a removal bed. The gas feed system to the bed contained 50 ml of potassium hydroxide pellets to remove acidic impurities from the gas before contacting the removal agent. The removal bed inlet was placed on a carbon monoxide feed line, and the removal bed outlet connected to the feed inlet of a bench-scale, oxo reactor. The oxo reactor was a vertical tubular vessel of 1-inch diameter × 4-feet in height. Propylene, hydrogen, and carbon monoxide were fed to the reactor at the bottom through a frit and passed upwardly through a hydroformylation catalyst solution. The catalyst solution was typical for hydroformylations of alkanes and comprised 14 mg of rhodium charged as the 2-ethylhexanoate salt and 340 mg of the ligand tricyclohexylphosphine dissolved in 175 ml of 2,2,4-trimethylpentane-1,3-diol monoisobutyrate solvent. Butyraldehyde product (iso and normal) was stripped from the reactor and collected in a high pressure separator. The carbon monoxide at room temperature passed through the removal bed at 200 psig at a flow rate of 2.5 standard liters per minute. The oxo reactor was operated at 200 psig and temperatures between 120° C. and 125° C., and the hydroformylation runs were 5 to 6 hours in length. The table below shows, for hydroformylation runs carried out with and without the iron pentacarbonyl removal bed, the concentrations of iron in mg per liter of butyraldehyde product and in mg per liter of recovered catalyst solution.

TABLE

| | Iron Concentrations in Oxo Products | | |
| --- | --- | --- | --- |
| | | Iron Concentration, ppm | |
| Run Number | Iron Removal Bed | Butyraldehyde | Recovered Catalyst (Rh) |
| 1 | No | 1.4 | 0.8 |
| 2 | No | 2.2 | 1.2 |
| 3 | No | 0.9 | 0.5 |
| 4 | No | 400.0 | 70.0 |
| 5 | No | 6.2 | 3.0 |
| 6 | No | 4.0 | 1.0 |
| 7 | No | 3.9 | 4.7 |
| 8 | No | 7.2 | 10.0 |
| 9 | No | 32.0 | 6.6 |
| 10 | No | 5.3 | 2.3 |
| 11 | No | 18.0 | 6.0 |
| 12 | No | 21.5 | 11.5 |
| 13 | No | 30.0 | 10.0 |
| 14* | No | 175.0 | 40.0 |
| 15* | No | 115.0 | 10.0 |
| 16* | Yes | 3.9 | 0.8 |
| 17* | Yes | 2.2 | 0.7 |
| 18 | Yes | 0.3 | 2.0 |
| 19 | Yes | 0.2 | 2.3 |
| 20 | Yes | <0.1 | 0.5 |
| 21 | Yes | 0.5 | 3.6 |
| 22 | Yes | 0.3 | 6.4 |
| 23 | Yes | <0.1 | <0.1 |
| 24 | Yes | <0.1 | <0.1 |
| 25 | Yes | 0.3 | <0.1 |

*These runs used the same cylinder of carbon monoxide.

The invention functions through a chemical reaction of the alkali metal hydroxide with the iron pentacarbonyl. It is, therefore, desirable to have as high a percentage loading of the alkali metal hydroxide on the support as is practically possible. Percentage loadings of below 1% by weight alkali metal hydroxide would be undesirable because of the low capacity for iron pentacarbonyl removal that the bed would have before expiration. The higher alkali metal hydroxide loadings are most desirable provided they do not clog the support pores and diminish effective surface area. Loading between about 1% and about 40% by weight of the support are operable, and loadings between about 10 and about 20% by weight appear to be optimum for the diatomaceous earth support. Typical diatomaceous earth has bulk densities ranging from about 25 to about 28 lb/ft$^3$, specific gravities from about 1.98 to about 2.25, silica contents from about 85 to about 92% by weight, particle sizes of from about 40 to about 82% retained on 20 mesh, and surface areas of from about 10 to about 30 m$^2$/gm. As actually used in the examples herein, the particle size was 8–12 mesh. Other supports which can be used include materials such as bentonite, carbon (activated), MgO, MgCO$_3$ or the like which can be in a fixed bed or slurried in a suitable medium such as triethylene glycol or methanol.

The high boiling hydroxylic solvent should dissolve high concentrations of alkali metal hydroxide. It is desirable that the solvent should dissolve the alkali metal hydroxide to yield solutions that are at least 1% by weight or greater in dissolved alkali metal hydroxide. It is important that the solvent not react with and neutralize the alkali metal hydroxide. Other functional groups as in triethanolamine and other amino alcohol compounds may be included in addition to the hydroxlic functionality provided they do not react with the alkali metal hydroxide.

The invention has been described in detail with particular reference to preferred embodiments thereof, but it will be understood that variations and modifications can be effected within the spirit and scope of the invention.

I claim:

1. A process for removing iron pentacarbonyl from carbon monoxide feed gas, comprising contacting said gas with a removal agent comprising alkali metal hydroxide in association with a high boiling hydroxylic solvent to form a nonvolatile iron carbonylate salt, and separating said gas from said agent and said salt.

2. The process of claim 1 wherein said removal agent is adsorbed on a porous support.

3. The process of claim 1 wherein the solvent is selected from triethylene glycol, methanol and mixtures thereof.

4. The process of claim 1 wherein said removal agent is adsorbed on a porous support at a concentration of from about 1% to about 40% by weight of the support, and the solvent is selected from one or mixtures of ethylene glycol, diethylene glycol, triethylene glycol, tetraethylene glycol. 2,2,4-trimethyl 1,3-pentanediol, glycerine, triethanolamine, 1,4-butanediol, 1 2-propanediol, 1,3-butanediol, 2,5-hexanediol, 1-hexanol and 2-hexanol.

5. The process of any one of claims 1-4 wherein the support is diatomaceous earth.

6. The process of any one of claims 1-4 wherein the process is carried out in continuous manner.

* * * * *